United States Patent [19]
Goldbach

[11] Patent Number: 5,253,452
[45] Date of Patent: Oct. 19, 1993

[54] SWIVEL-SLIDING DOOR SYSTEM FOR A VEHICLE

[75] Inventor: Horst Goldbach, Ratingen, Fed. Rep. of Germany

[73] Assignee: T.B.L. Beheer B.V., Leeuwarden, Netherlands

[21] Appl. No.: 931,035

[22] Filed: Aug. 14, 1992

[51] Int. Cl.⁵ .................................. E05D 15/10
[52] U.S. Cl. ........................... 49/212; 49/128; 49/213; 49/362; 49/409
[58] Field of Search ............... 49/212, 213, 216, 218, 49/221, 222, 225, 210, 209, 362, 360, 128, 130, 129, 409, 410, 411

[56] References Cited

U.S. PATENT DOCUMENTS

| | | | |
|---|---|---|---|
| 3,601,926 | 8/1971 | Weiher | 49/409 |
| 3,906,668 | 9/1975 | Simmons | 49/212 |
| 4,091,570 | 5/1978 | Favrel | 49/218 X |
| 4,188,752 | 2/1980 | Monot | 49/362 X |
| 4,409,905 | 10/1983 | Zerbi | 49/362 X |
| 4,753,038 | 6/1988 | Sohlstrom | 49/221 X |
| 4,924,625 | 5/1990 | Dilcher | 49/212 |
| 5,142,823 | 9/1990 | Brandenburg et al. | 49/218 X |

FOREIGN PATENT DOCUMENTS

| | | |
|---|---|---|
| 0225855 | 6/1987 | European Pat. Off. . |
| 0259568 | 3/1988 | European Pat. Off. . |
| 0320591 | 6/1989 | European Pat. Off. . |
| 0359640 | 3/1990 | European Pat. Off. . |
| 662233 | 6/1938 | Fed. Rep. of Germany ........ 49/212 |
| 2589938 | 5/1987 | France . |
| 1439940 | 6/1976 | United Kingdom . |

Primary Examiner—Philip C. Kannan
Attorney, Agent, or Firm—Merchant, Gould, Smith, Edell, Welter & Schmidt

[57] ABSTRACT

Swivel-sliding door system for a vehicle, having a door leaf situated in the vehicle wall in the closed state, and situated on the outside in front of the vehicle wall in the open state, and having drive means, transverse guide means and longitudinal guide means which make possible a swivel-sliding movement of the door leaf. The longitudinal guide means comprise a bearing rail which extends over the width of the door opening and which is coupled to drive members which can cause the bearing wheel to execute a movement transversely to the vehicle wall (3). The bearing rail is provided with a first set of rollers (62,63) which run in the bearing rail and which are mounted on a coupling member (65) which is provided with a second set of rollers (66,67) which are situated in a lower position and which interact with a door rail (6) attached to the top of a door leaf (1,2).

However, the drive means comprise a drive lever driven by the housing of a motor and lead screws which are driven by the spindle of the motor and which support nut members coupled to the door leaves.

The motor is mounted on a mounting plate whose bottom supports, moreover, a guide rail and roller guide members. The roller guide members interact with roller supports which are linked to the bearing rail and which are actuated by the drive lever. The spindle of the drive lever also actuates a lowermost swivel arm, coupled to the door leaf, via a vertical rod.

30 Claims, 7 Drawing Sheets

SWIVEL-SLIDING DOOR SYSTEM FOR A VEHICLE

The invention relates to a swivel-sliding door system for a vehicle, having at least one door leaf situated in the vehicle wall in the closed state, and situated on the outside in front of the vehicle wall in the open state and leaving the door opening free under these circumstances, drive means, and transverse guide means and longitudinal guide means being provided which make possible a movement of the at least one door leaf transversely with respect to the vehicle wall and along the vehicle wall.

Such swivel-sliding door systems have already been used for many years in, for example, train carriages for passenger transportation. An example of a known swivel-sliding door system is described in European Patent Application 0 259 568.

A swivel-sliding door system should make possible the above described movements of the at least one door and should also provide a locking of the at least one door in the closed state which is such that the door cannot be opened by the suction action of air flows past the travelling carriage or by passengers leaning against the door. In addition, as compact a construction as possible is desirable so that the drive and guide means occupy a relatively little space. It is also desirable that the component parts of a swivel-sliding door system can as far as possible be preassembled.

The object of the invention is to provide a swivel-sliding door system which fulfils the requirements stated above. More generally, the object of the invention is to provide a reliably operating, low-maintenance, and robustly and compactly constructed swivel-sliding door system which is relatively easy to assemble.

According to the invention, a swivel-sliding door system of the type described above is characterised in that the longitudinal guide means comprise a bearing rail which extends over essentially the entire width of the door opening and is coupled to drive members which can cause the bearing rail to execute a movement transversely to the vehicle wall, the bearing rail being provided with a first set of rollers which run in the bearing rail and are supported on spindles which are mounted on a coupling member extending beyond the bottom of the bearing rail, which coupling member is provided with a second set of rollers which are situated in a lower position and interact with a door rail situated under the bearing rail and attached to the top of the door leaf.

The invention will be described in greater detail below by reference to the accompanying drawing of an exemplary embodiment.

FIG. 1 shows diagrammatically a rear view of an exemplary embodiment of a swivel-sliding door system according to the invention having two door leaves in the closed state;

FIG. 2 diagrammatically shows a plan view of the system of FIG. 1;

Figure 8:
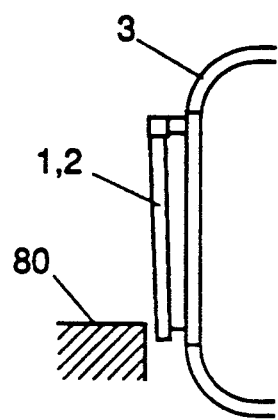
Figure 7:
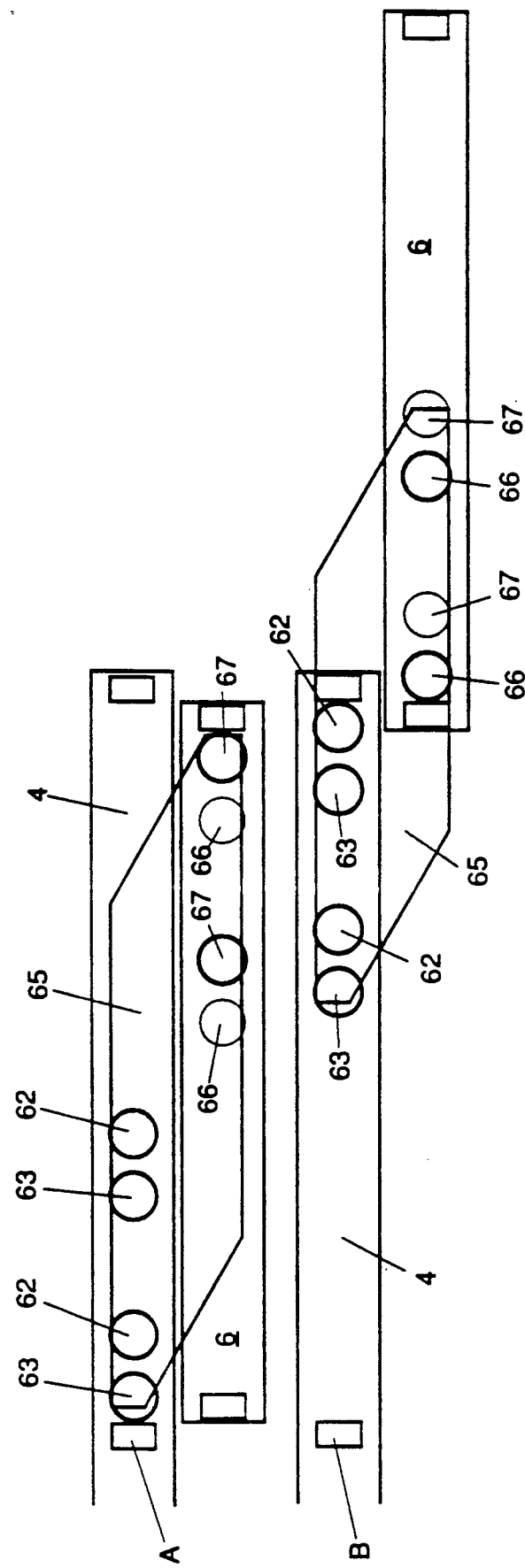
Figure 9:
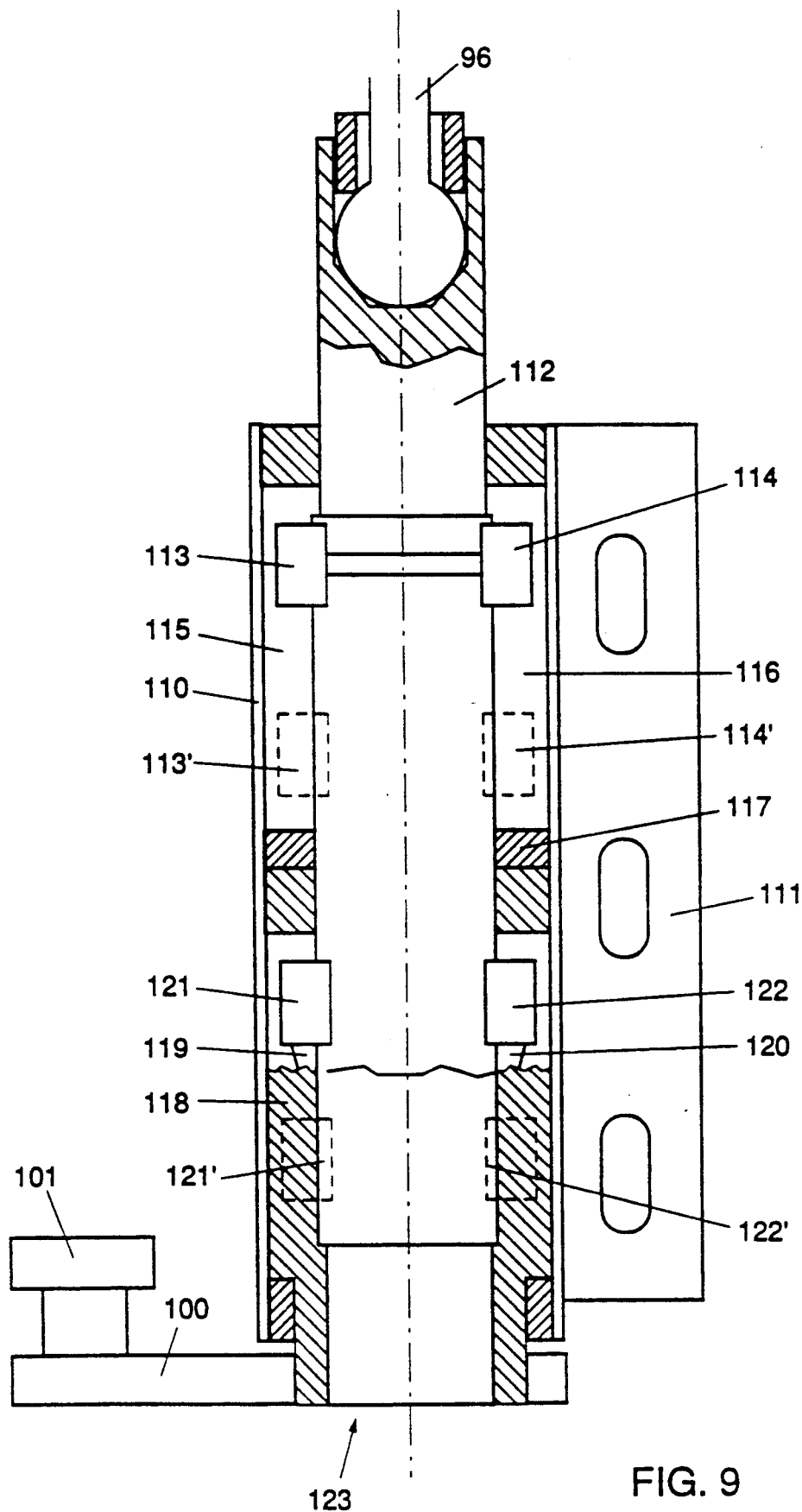

FIG. 7 diagrammatically shows a detail of the door leaf suspension in the closed and in the open position of a door leaf;

FIG. 8 diagrammatically shows a cross section of a train carriage with open doors; and FIG. 9 shows a detail of the door operating means at the bottom of a door leaf.

Figure 1:
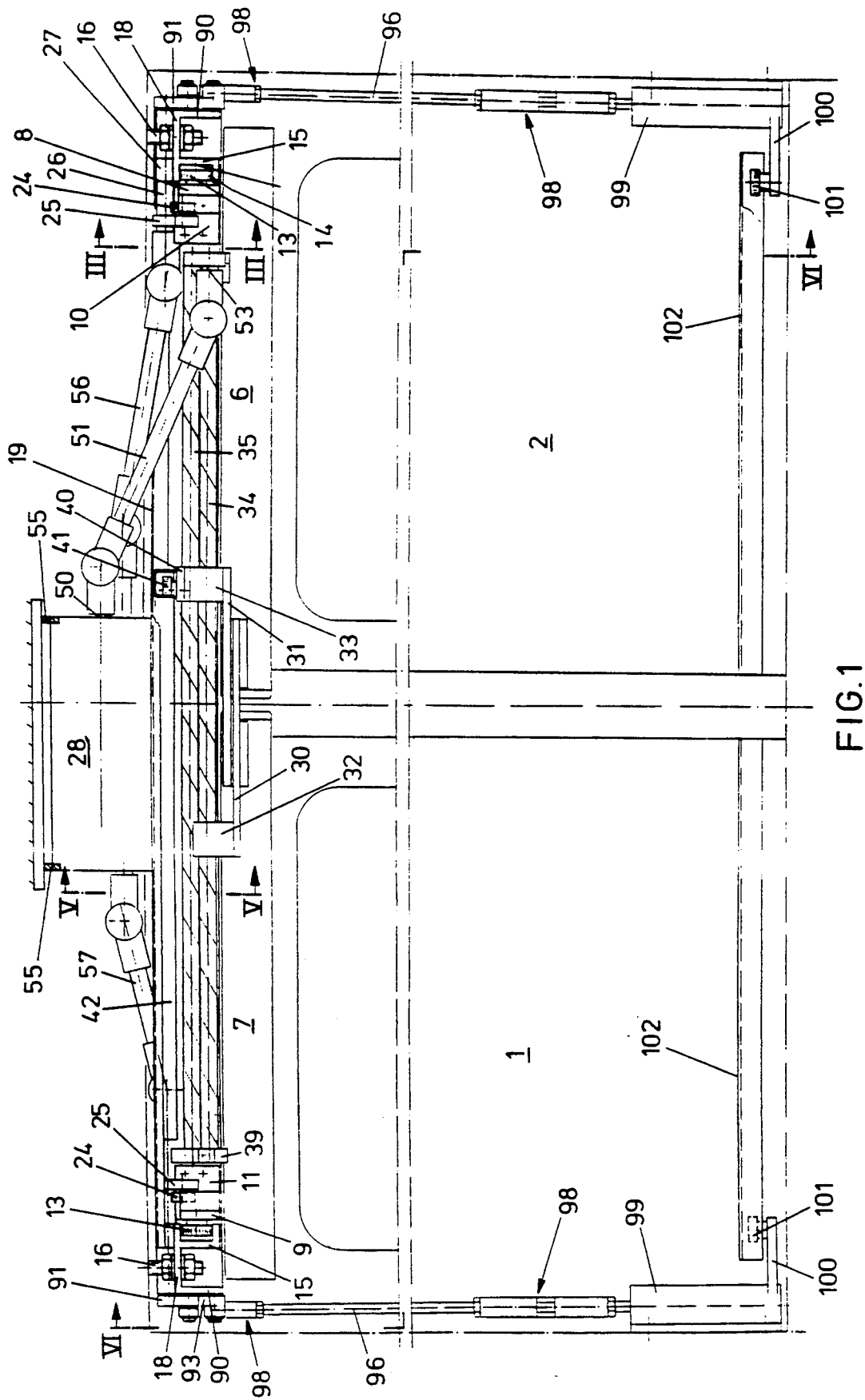

FIG. 1 diagrammatically shows a rear view, that is to say a view from within the vehicle in which the door system is mounted, of a swivel-sliding door system according to the invention. In the example shown, the swivel-sliding door system comprises two door leaves 1 and 2 which can be moved jointly in a direction transverse to the vehicle wall 3 (FIG. 2) and which can slide in opposite directions along the vehicle wall. It is pointed out that the invention can be used equally as well in the case of a single door leaf.

The drive and guide means with the aid of which the movements needed to open and close the door leaves are executed and guided are, as usual, largely situated at the top of the door leaves.

Said means comprise a bearing rail 4 which is still to be described in greater detail below and which can best be seen in plan view in FIG. 2 and cross section in FIG. 3. The bearing rail has a length which essentially corresponds to the width of the total door opening 5. In the example shown, the bearing rail acts together with a door leaf rail 6, 7 planted at the top edge of a door leaf via a roller system still to be described in greater detail. As can be seen in FIG. 3, the door leaf rails are situated just below the bearing rail and are therefore not visible in FIG. 2.

The bearing rail is coupled to means which make possible a movement of the bearing rail, and consequently of the door leaves, transversely to the vehicle wall. FIGS. 1, 2 and 3 show roller supports 8, 9 which are situated near the ends of the bearing rail 4 and which extend transversely inwards, that is to say into the vehicle, from the bearing rail. The roller supports 8, 9 are each attached to the bearing rail by means of a flange 10, 11 and suitable attachment means such as, for example, screws.

In this example, the roller supports each support two vertically oriented rollers 12, 13 which are situated in line one behind the other and rest on a running surface 14 of a roller guide member 15 which extends along each roller support 8 but is firmly joined to the vehicle. The rollers 12, 13 are rotatably attached to the support and the rollers can therefore roll over the running surface 14 in a direction transverse to the vehicle wall.

Via the rollers, the roller guide members 15 carry the weight of the guide rail and doors and are attached to the vehicle by means of bolts 16 which extend through openings 17 in a horizontal flange 18 formed on the side of each roller guide member 15 remote from the running track. The two roller guide members are mutually joined by a mounting plate 19 so that the two roller guide members and the mounting plate form an assembly unit. The openings 17 in the example shown are elongated, so that the position of the assembly unit can be accurately adjusted.

Preferably, the roller supports 8 are each also provided with at least one horizontal roller (not shown) which provides for the transverse guiding of the roller supports with respect to the roller guide members. The transverse rollers interact with a vertical running surface 20 adjacent to the horizontal running surface 14. As an alternative, the running surface of the vertical rollers can be profiled and interact with a complimentary profiled running surface of the roller guide member.

At the side remote from the associated roller guide member, the roller supports 8 are each provided with a cam track 21 which is formed by two approximately concentric curved ribs 22, 23. A roller 24 which is mounted on the free end of a lever 25 engages between the ribs 22, 23. The other end of the lever 25 is provided with a transverse spindle 26 which can advantageously be supported in a supporting member 27 mounted on the associated roller guide member.

Figure 3:
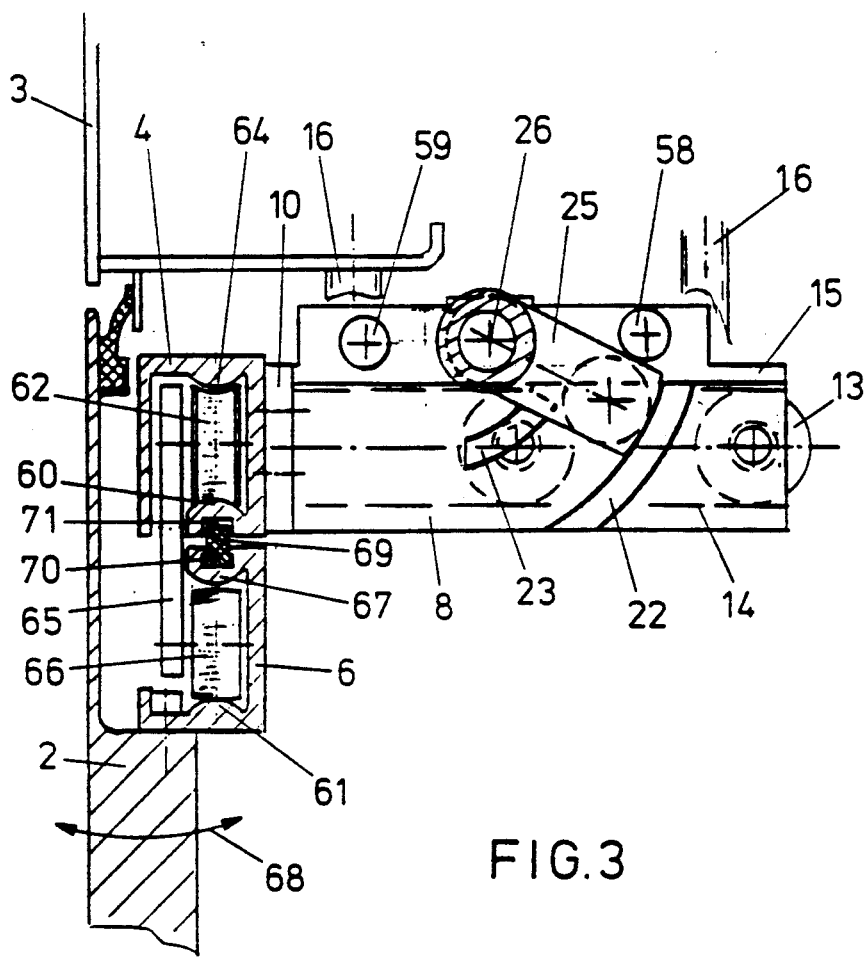
FIG. 3 shows a section along the line III—III in FIG. 1.
Figure 4:
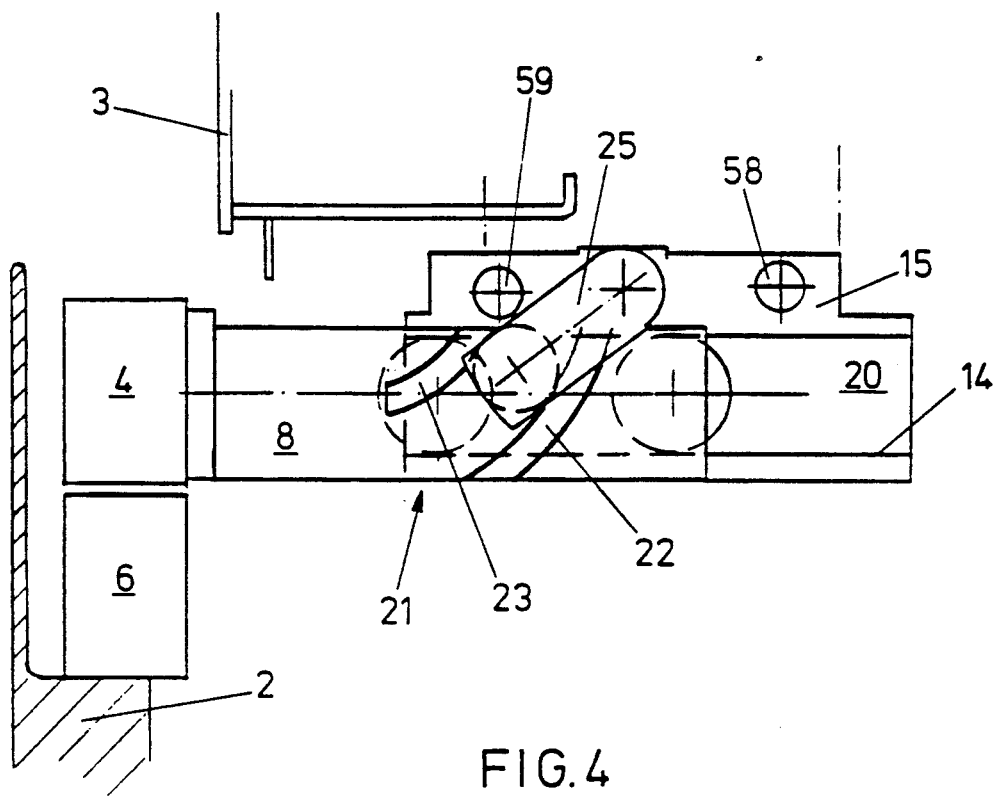
FIG. 4 shows a section corresponding to FIG. 3, with the doors in the pushed-out state.

The transverse spindle 26 also extends from the lever 25 in the direction of the door opening and is coupled for rotation to a drive motor 28. From a downwardly inclined and rearwardly directed position in FIG. 3, the lever 25 can be rotated clockwise as seen in FIG. 3, approximately a quarter of a revolution to a downwardly inclined and forwardly directed position as shown in FIG. 4. At the same time, the rotary movement makes possible a forward displacement of the roller supports 8, 9, and therefore of the bearing rail 4 and the door leaves 1, 2, to a position shown in FIG. 4, in which the bearing rail and the door leaves are situated outside the plane of the vehicle wall 3. In that position, the door leaves can be pushed along in front of the vehicle wall.

The movement of the door leaves along the vehicle wall can be achieved in various ways known for the purpose. According to the invention, use is preferably made of a lead screw drive for this purpose. Each door leaf is provided with a carrier 30, 31 which extends backwards and which is attached to the door leaf rail 6, 7 in the example shown.

The top of each carrier supports a nut member 32, 33 which interacts with an associated lead screw 34, 35 extending in the width direction of the door opening. Near one end, the lead screws 34, 35 are coupled to one another via gears 36, 37 (FIG. 2), and have opposite directions of rotation and the same pitch. The gears are driven via a drive gear 38 which engages in the gear 36 in the example shown. The drive can also be such that the lead screws rotate in the same direction, provided the lead screws have an opposite pitch.

The lead screws may, if desired, also be provided at the other ends with mutually engaging gears, but in the example shown, they are supported at the other ends (on the left in FIGS. 1 and 2) in a bearing support 39.

In order to determine the movement of the door leaves accurately, one of the door leaves is provided with a roller which runs in a horizontal guide rail. In the example shown, the carrier 33 is provided at the top of a rearwardly extending flange 40 with a roller 41 which extends from the bottom into an inverted U-shaped guide rail 42.

The guide rail extends largely parallel to the bearing rail 4 and is mounted against the bottom of the mounting plate 19. In the example shown, the guide rail extends above the left-hand part (seen in FIGS. 1 and 2) of the door opening. The end of the guide rail situated near the centre of the door opening is provided with a rearwardly curved arc-shaped part 43.

Figure 2:
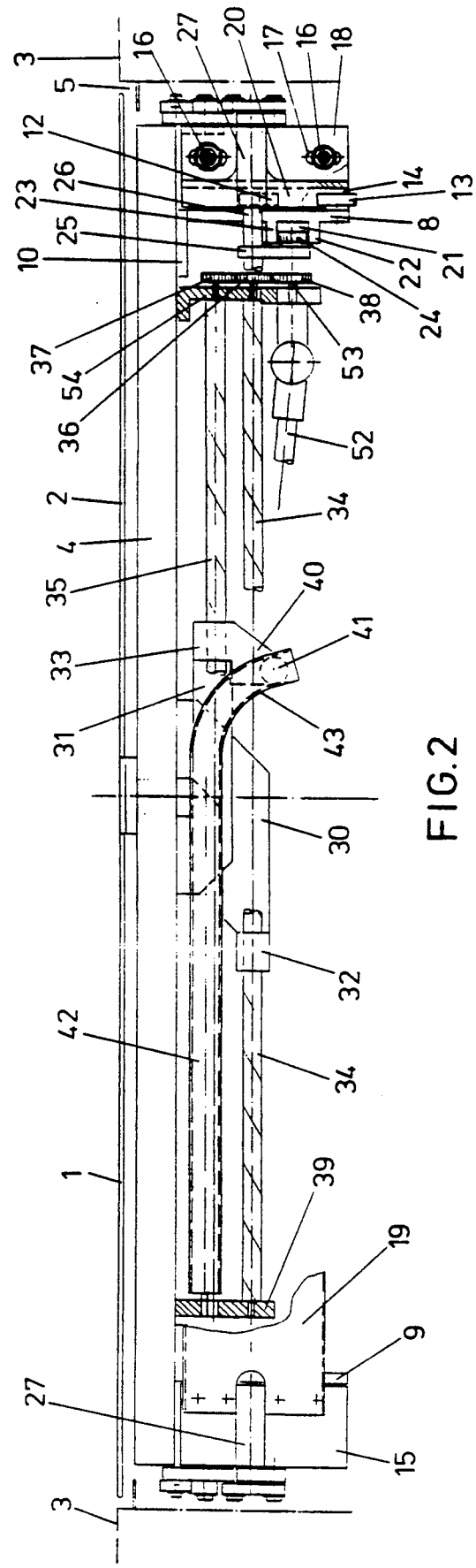
Figure 5:
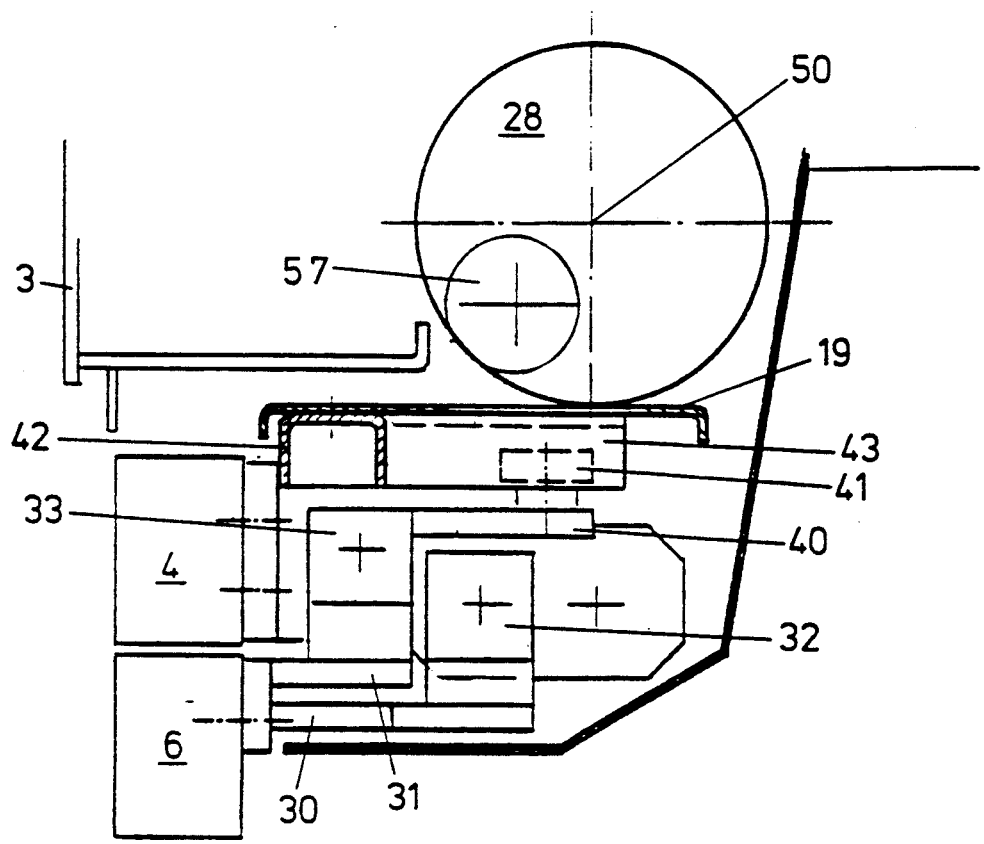
FIG. 5 shows a section along the line V—V in FIG. 1.

In the closed state of the door leaves the roller 41 is situated near the free end of the arc-shaped part 43, as can be seen in FIGS. 2 and 5. As the door leaves are moved via the bearing rail 4 outside the plane of the vehicle wall, the roller 41 is forced to follow the curved part 43 of the guide rail 42. The door leaf 1 directly linked to the roller 41 consequently moves outwards and also to some extend to the left. This is only possible if the lead screw 35 rotates at the same time. As will be described in greater detail, the drive means are so designed that the lead screw 35 can in fact already rotate while the door leaves are moving out of the plane of the vehicle wall. Since the lead screw 35 is coupled via the gears 37 and 36 to the lead screw 34, the lead screw 34 also rotates at the same time, so that the other door leaf 2 makes a similar movement outwards and to the right. As soon as the right-hand part of the guide rail has been reached, the door leaves can only move sideways along the vehicle wall if drive is continued. When the door is closed, the door leaves move in the opposite direction.

The driving of the door leaves is provided by a drive motor 28 which is mounted on the mounting plate 19. The drive motor is preferably an electric motor. The spindle 50 of the motor 28 is coupled via a cardan spindle transmission 52 to the spindle 53 of the drive gear 38 already described. The spindle 53 is supported in a bearing support 54 in which the ends of the lead screws provided with the gears 36 and 37 are also supported and which is attached to the bearing rail 4.

According to a more detailed elaboration of the invention, the housing of the drive motor 28 is preferably mounted so as to be able to rotate through a predetermined angle. If, therefore, rotation of the spindle of the motor is obstructed, the motor housing will rotate in the opposite direction around spindle 50 as a result of the reactive force which occurs. The support of the motor housing is indicated diagrammatically by 55 in FIG. 1.

The motor housing is eccentrically coupled on either side via cardan spindles 56, 57 to the levers 25.

If the motor 28 is energised in order to open the door, the rotation of the spindle 50 of the motor is in the first instance essentially prevented as a consequence of the fact that the free end of the curved part 43 of the guide rail 42 prevents, or virtually prevents a sideways movement of the door leaves. The housing of a motor 28 therefore drives the levers 25 via the cardan spindles 56 and 57, as a result of which the roller supports 8 and 9 are able to move forward. As the roller supports move forward, a more pronounced sideways movement of the door leaves becomes possible. As already stated, this movement should be accompanied by a rotation of the lead screws 34, 35. This rotation automatically takes place via the cardan spindle 51 coupled to the motor spindle as a consequence of the fact that the curved part 43 of the guide rail also prevents the forward-directed movement to some extent. It has been found that as a result of using a motor with a rotatably suspended housing and a driven spindle, the housing bringing about in the manner described the forward-and-backward-directed movement of the door leaves and the spindle the sideways movement, these two movements, which are at right angles to one another, smoothly merge into one another when controlled by a suitably shaped curved guide rail section and a cam which runs therein, is linked to a door leaf and is preferably constructed as a roller.

The motor housing may be directly linked to the cardan spindles 56, 57, but it is also possible to make use of a gear transmission or an intermediate lever or the like to transmit the rotation of the housing to the cardan spindles.

The levers 25 rest against an end stop 58, at least in the closed position of the door. Preferably, the curvature of the rib 22 and the position of the end stop 58 are chosen in such a way that the lever is pushed by the rib 22 in the direction of the end stop in the closed position of the door if a forward-directed force is exerted on the roller supports. Such a force may be the consequence of passengers leaning against the door leaves or of suction forces acting on the door leaves.

In the example shown, a second stop 59 is present for the other end position of the lever 25, which second end stop 59 achieves the result that the bearing rail moves just as far out of the plane of the vehicle wall at the ends as corresponds to the forward-directed component of the curved movement path of the roller 41 as is determined by the curved part 43 of the guide rail 42.

The suspension of the door leaves on the bearing rail and the bearing rail itself will now be described in greater detail. The function of the bearing rail is to carry the door leaves in the forward-and backward-directed movement transversely to the vehicle wall 3. The bearing rail is used, moreover, to make possible the sideways movement of the door leaves along the vehicle wall. Finally, the door leaf suspension should be such that the doors are able to hang to some extent out of plumb, as shown in FIG. 8. On the one hand, the tops of the door leaves must be moved out of the plane of the vehicle wall far enough for the bearing rail and the door rails to be situated completely outside the plane of the vehicle wall and on the other hand, the distance between the vehicle and the platform 80 must be as small as possible to prevent passengers getting caught between vehicle and platform. Both these requirements can be fulfilled if the door leaves hang to some extent out of plumb in the open position, as is shown exaggeratedly in FIG. 8.

The door leaf suspension is shown in greater detail in FIGS. 3 and 7. FIG. 3 shows a cross section of the bearing rail 4 and a door rail 6 situated underneath. The bearing rail 4 and the door rail 6 are essentially similar in shape and both have the form of a horizontal letter U in cross section. In this example, the bearing rail 4 also has an additional hanging flange, but this is not essential. A corresponding upright flange could be formed on the door rail. Formed on the lowermost horizontal limb of the two rails is a running surface 60 or 61, respectively, which is convex in cross section, for bearing and supporting rollers. Rollers 62 having a concave running surface interact with the running surface 60. As can be seen in FIG. 7 two rollers 62 spaced apart from one another are used and these are supported by the convex running surface 60 of the bearing rail. Also provided in the bearing rail are a further two additional rollers 63, likewise having a concave running surface. The additional rollers 63 interact with a running surface 64, likewise convex, which is formed opposite the running surface 60 on the uppermost limb of the U-shaped. For this purpose, the additional rollers 63 are placed somewhat higher than the rollers 62. The rollers 62, 63 are supported in a bearing plate which in this example is approximately lozenge-shaped and which, as a consequence of the additional rollers cannot tilt in its own plane and, as a consequence of the convex running surfaces 60, 64 and the complementarily shaped rollers 62, 63 can also not tilt in the transverse direction.

The bearing plate 65 extends downwards to a position alongside the door rail 6 situated underneath the bearing rail and is provided in the vicinity of the lower edge with door rollers 66, 67 which are mounted in offset position with respect to the rollers 62, 63. The rollers 67 are again rollers which have a concave running surface and which interact with a complementarily shaped convex running surface 68 of the uppermost limb of the door rail. Since the door is suspended on the door rail, the rollers 67 are bearing rollers. The rollers 66 are supporting rollers which counteract tilting in the plane of the door. For this purpose, the rollers 66 are placed somewhat lower than the rollers 67. In addition, the rollers 66 have a convex running surface. This means that the door leaf can tilt sideways to some extent with respect to the supporting rollers 66, as is indicated by an arrow P. The concave rollers 67 do not prevent this since they are only in contact with the complementarily shaped convex running surface of the uppermost limb of the door rail.

The bearing rail and the door rails are moreover coupled to one another by a coupling strip 69 which extends in the longitudinal direction between the rails and which extends into the longitudinal grooves 70, 71 in the uppermost limb of the door rail and the lowermost limb of the bearing rail. In the example shown, the coupling strip 69 is mounted in a fixed manner in the door rail and, as a result of the use of a shoulder, it cannot move upwards out of the groove 70. The uppermost part of the coupling strip 69 extends with a certain amount of clearance into the groove 71 in the bearing rail, as a result of which the tilting movement indicated by an arrow 68 remains possible. Said tilting movement takes place around an imaginary axis which is situated precisely between the rails in the coupling strip. The tilting movement also makes it possible to absorb manufacturing tolerances and the like.

Part A in FIG. 7 shows one end of the bearing rail 4 with a door rail 6 situated underneath in the closed state of the door, while part B shows the position of the rails 4 and 6 and the bearing plate 65 with the various bearing and supporting rollers in the case of an open door.

Figure 6:
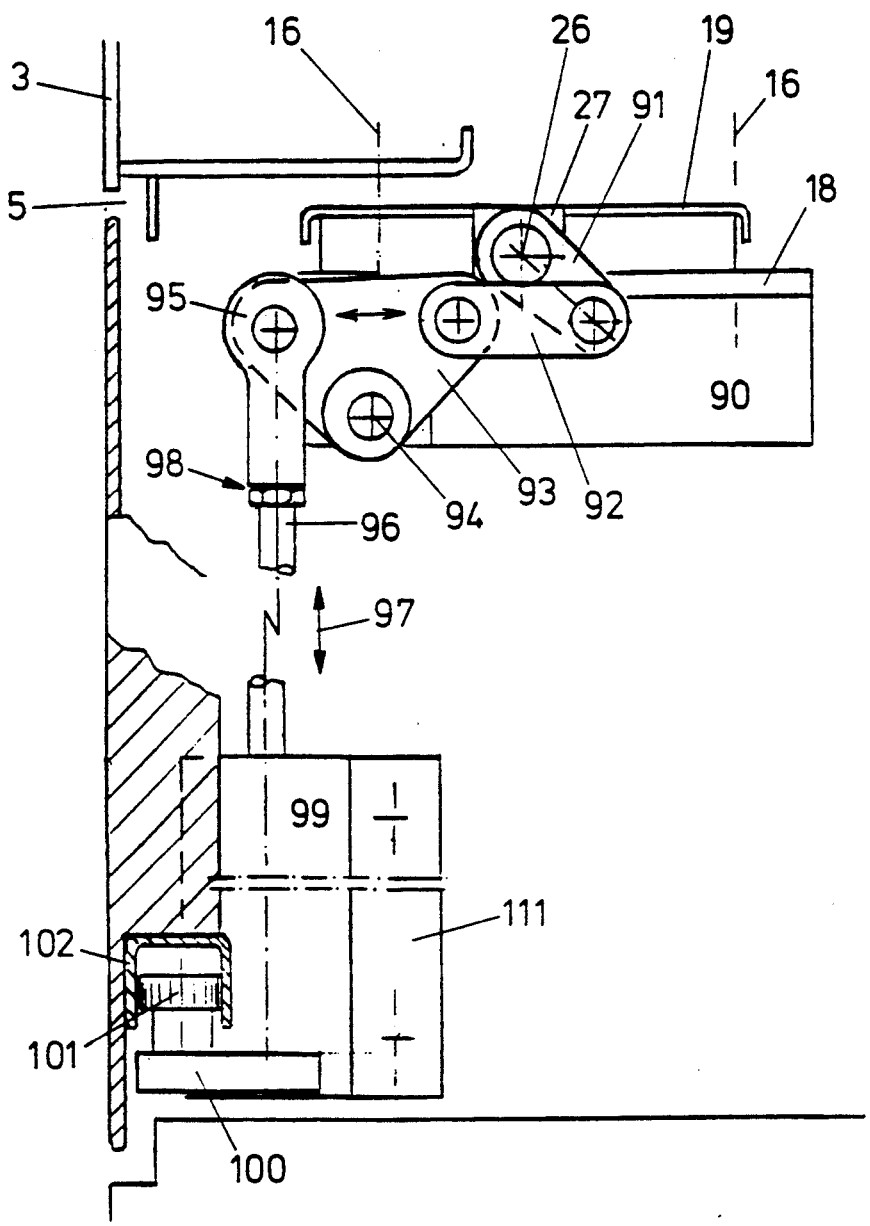
FIG. 6 shows a section along the line VI—VI in FIG. 1.

FIGS. 1, 6 and 9 diagrammatically show the way in which the door leaves can be guided and driven at the bottom. Only the drive for the swivel movement of the door leaves needs to be transmitted at the bottom. The sliding movement is already adequately transmitted to the door leaves at the top.

The levers 25 driven by the cardan spindle 56 have, as described above, a spindle 26 (FIG. 1) which is supported in a supporting member 27. Each spindle 26 extends past the associated supporting member 27 and past the horizontal flange 18 of the roller guide member 15. The free edge of the horizontal flange 18 is provided with an overhanging flange 90. The free end of the spindle 26 supports a lever 91 which extends along the face of the overhanging flange 90 and which, moreover, is coupled via a coupling strip 92 to a tilting piece 93 which is mounted so as to rotate around a spindle 94 extending transversely to the flange 90. In the example shown, the coupling piece is approximately triangular, one vertex of the triangular shape being directed downwards and the spindle 94 being situated in the vicinity of the downwardly directed vertex. The coupling strip is coupled by means of one uppermost vertex and is pivotably linked in the vicinity of the other vertex to the end of a vertical bar or tube 96, as shown at 95.

FIG. 6 shows that rotation of the lever 91 results in tilting of the tilting piece 93 around the spindle 94 and in upward or downward movement of the bar 96, as is shown diagrammatically by an arrow 97. The length of the bar 96 can be adjusted by screwing it in or out, as is shown diagrammatically in FIG. 1 at 98.

The lower end of the vertical bar 96 is coupled via a transmission device 99 to a swivel arm 100 whose free end supports a roller 101 which runs in an inverted U-shaped rail 102 mounted on the inside of the respective door leaf.

The transmission device 99 is designed to convert a vertical movement into a rotary movement in the horizontal plane. An example of a suitable transmission device is shown diagrammatically, partly in section, in FIG. 9. The transmission device shown comprises a vertically placed cylindrical housing 110 which is provided with one or more mounting flanges 111. A thicker rod or tube 112 in line with the bar 96 and coupled thereto extends into the housing 110. The rod or tube is provided with a first set of cams or rollers 113, 114 which extend on either side into vertical grooves 115, 116 in a bush 117 mounted in a fixed manner in the housing. The rod or tube 112 is able to move upwards and downwards in a vertical direction in the bush 117. Mounted in line with the bush 117 is a second bush 118, which is, however, supported so as to rotate in the housing 110. The second bush is provided moreover, with two mutually oppositely situated, approximately helical grooves 119, 120 which, in this example, occupy an approximately 90° path. Extending into the grooves 119, 120 are again rollers or cams 121, 122 which are mounted on the rod or tube 112.

When the rod 96 moves downwards out of the position shown, the rod 112 also moves downwards. As a consequence of the rollers 113, 114 extending into the grooves 115, 116, the rod is unable to rotate. The rollers 121, 122 therefore also move in a purely vertical direction. The bush 118 is then caused to rotate by the curved grooves 119, 120. The bush 118 is linked in a fixed manner to the swivel arm 100 as shown at 123 and the swivel arm therefore follows the rotation of bush 118. The length of the swivel arm and the angle of rotation permitted by the curved grooves 119, 120 determine the distance through which the door leaves can swivel outwards at the bottom. This distance can therefore be adjusted precisely by means of the shape of the grooves.

It is pointed out that, preceding from the above, various modifications are obvious to the person skilled in the art. Such modifications are deemed to fall within the scope of the invention.

I claim:

1. Swivel-sliding door system for a vehicle having at least one door leaf situated in the vehicle wall in the closed state, and situated on the outside in front of the vehicle wall in the open state and leaving the door opening free under these circumstances, drive means, and transverse guide means and longitudinal guide means being provided which make possible a movement of at least one door leaf transversely with respect to the vehicle wall and along the vehicle wall, wherein the longitudinal guide means comprise a bearing rail (4) which extends over essentially the entire width of the door opening and is coupled to drive members which can cause the bearing rail to execute a movement transversely to the vehicle wall (3), the bearing rail being provided with a first set of rollers (62,63) which run in the bearing rail and are supported on spindles which are mounted on a coupling member extending beyond the bottom of the bearing rail, which coupling member is provided with a second set of rollers (66,67) which are situated in a lower position and interact with a door rail (6) situated under the bearing rail and attached to the top of the door leaf (1,2).

2. Swivel-sliding door system according to claim 1, wherein the coupling member (65) provided with rollers is an approximately lozenge shaped plate.

3. Swivel-sliding door system according to claim 1, wherein the bearing rail and the door rail both comprise a horizontal, essentially U-shaped profile, the mutually facing surfaces of both the lowermost limbs and the uppermost limbs of the U-shapes of both of the rails forming roller running surfaces.

4. Swivel-sliding door system according to claim 3, wherein the first set of rollers comprises at least one bearing roller running on the running surface of the lowermost limb of the bearing rail and at least one supporting roller interacting with the running surface of the uppermost limb of the bearing rail.

5. Swivel-sliding door system according to claim 3, wherein the second set of rollers comprises at least one bearing roller interacting with the running surface of the uppermost limb of the door rail and at least one supporting roller interacting with the running surface of the lowermost limb of the door rail.

6. Swivel-sliding door system according to claim 3, wherein the roller running surfaces of the bearing rail and of the door rail are surfaces which are convex in cross section, and the bearing and supporting rollers (62,63) running in the bearing rail have a complementarily shaped concave running surface.

7. Swivel-sliding door system according to claim 6, wherein the bearing rollers extending into a door rail have a concave running surface, while the supporting rollers extending into a door rail have a convex running surface.

8. Swivel-sliding door system according to claim 3, wherein the lowermost limb of the bearing rail is provided in the lower side, remote from the running surface thereof, with a longitudinal groove into which a coupling strip (69) loosely extends, which coupling strip (69) is mounted in a groove provided in the opposite surface of the uppermost limb of a door rail.

9. Swivel-sliding door system according to claim 1, wherein the drive members which can cause the bearing rail to move transversely to the vehicle wall comprise roller supports (8, 9) which are linked to the bearing rail near the ends of the bearing rail, and extend essentially horizontally rearward, which roller supports are provided with a number of rollers which interact with at least one running surface (14) of a roller guide member (15) mounted in a fixed manner, and first drive elements (25) for the roller supports.

10. Swivel-sliding door system according to claim 9, wherein the drive members include a drivable spindle, the first drive elements for the roller support (8,9) comprising a drive lever, one end of which is mounted outside the roller support on a driveable spindle and the free end of which is able to move along the roller support, the roller support being provided with a groove in which a cam (24) mounted on the free end of the lever engages.

11. Swivel-sliding door system according to claim 10, wherein the groove is formed by two curved ribs (22,23) which are formed with a gap on the roller support.

12. Swivel-sliding door system according to claim 10, wherein the cam is a rotatable roller.

13. Swivel-sliding door system according to claim 10, wherein the drivable spindle is mounted on the roller guide member.

14. Swivel-sliding door system according to claim 10, wherein the roller guide member is provided with at least one end stop (58,59) for the drive lever.

15. Swivel-sliding door system according to claim 10, wherein the drivable spindles of the drive levers (25) are each coupled via a cardan spindle (56,57) with a drive motor (28).

16. Swivel-sliding door system according to claim 15, wherein each door rail is provided with a carrier (30,31) which extends into the vehicle and which supports a nut member (32,33) which interacts with a drive lead screw (34,35) which extends parallel to and behind the bearing rail, a separate drive lead screw is provided for each door leaf and each drive lead screw is provided at at least one of the ends with a gear which is linked to a driving gear, the driving gear for the drive lead screws is coupled to the drive motor (28) via a cardan spindle (51) and the drive motor for the drive levers is the same motor as the drive motor for the drive lead screws, the motor housing being rotatably mounted and being coupled to the drive levers, while the motor spindle is coupled to the drive gear for the drive lead screws.

17. Swivel-sliding door system according to claim 16, wherein the drive motor is an electric motor.

18. Swivel-sliding door system according to claim 16, wherein the drive motor (28) is mounted on a mounting plate (19).

19. Swivel-sliding door system according to claim 10, wherein at least one essentially vertical bar or tube (96) whose upper end is coupled to second drive elements which are coupled to the drive members and which are able to cause the rod or tube to execute an upward or downward movement and whose lower end interacts with a transmission device (99) which is capable of converting a vertical movement into a rotation in a horizontal plane of a swivel arm whose free end supports a cam (101) which engages in a guide rail (102) mounted on a door leaf, the second drive elements comprising a lever (91) coupled to a tilting piece (93), and said lever (91) is mounted on the spindle (26) of the drive lever (25) for a roller support (8,9).

20. Swivel-sliding door system according to claim 9, wherein the roller guide members have, on the side remote from the adjacent roller supports, an essentially horizontal flange via which the roller guide members are joined to the vehicle.

21. Swivel-sliding door system according to claim 9, wherein the roller guide members are linked on either side of a door opening by a mounting plate (19).

22. Swivel-sliding door system according to claim 21, wherein the guide rail is mounted against the bottom of the mounting plate and at least one of the carriers is provided with a roller (41) which extends into a guide rail having a straight section and a curved end.

23. Swivel-sliding door system according to claim 1, wherein each door rail is provided with a carrier (30,31) which extends into the vehicle and which supports a nut member (32,33) which interacts with a drive lead screw (34,35) which extends parallel to and behind the bearing rail.

24. Swivel-sliding door system according to claim 23, wherein a separate drive lead screw is provided for each door leaf and wherein each drive lead screw is provided at at least one of the ends, with a gear which is linked to a driving gear.

25. Swivel-sliding door system according to claim 24, wherein two door leaves having associated drive lead screws are provided, and wherein both drive lead screws are provided with a gear which engages in the gear of the other drive lead screw, and wherein one of the gears interacts with a driving gear.

26. Swivel-sliding door system according to claim 24, wherein the driving gear for the drive lead screws is coupled to the drive motor (28) via a cardan spindle (51).

27. Swivel-sliding door system according to claim 23, wherein at least one of the carriers is provided with a roller (41) which extends into a guide rail having a straight section and a curved end.

28. Swivel-sliding door system according to claim 1, comprising at least one essentially vertical bar or tube (96) whose upper end is coupled to second drive elements which are coupled to the drive members and which are able to cause the rod or tube to execute an upward or downward movement and whose lower end interacts with a transmission device (99) which is capable of converting a vertical movement into a rotation in a horizontal plane of a swivel arm whose free end supports a cam (101) which engages in a guide rail (102) mounted on a door leaf.

29. Swivel-sliding door system according to claim 28, wherein the second drive elements comprise a lever (91) coupled to a tilting piece (93).

30. Swivel-sliding door system according to claim 28, wherein the transmission device comprises a fixed bush having at least one vertical groove and a rotatable bush situated in line with the fixed bush and having at least one curved groove, the rotatable bush being linked to the swivel arm; and wherein a tube or bar extends into the fixed and the rotatable bush and is provided with cams, projecting sideways, which extend into the grooves, which tube or bar can move upwards and downwards under the control of the rod (96), as a result of which the rotatable bush is caused to rotate.

* * * * *